(12) United States Patent
Nakazawa et al.

(10) Patent No.: US 6,783,282 B2
(45) Date of Patent: Aug. 31, 2004

(54) OPTICAL WAVELENGTH FILTER

(75) Inventors: Tadao Nakazawa, Kawasaki (JP);
Hideyuki Miyata, Kawasaki (JP);
Masaharu Doi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/106,359

(22) Filed: Mar. 27, 2002

(65) Prior Publication Data

US 2003/0123774 A1 Jul. 3, 2003

(30) Foreign Application Priority Data

Dec. 28, 2001 (JP) .................................... 2001-399240

(51) Int. Cl.$^7$ ............................ G02F 1/335; G02B 6/34; G02B 6/38
(52) U.S. Cl. ............................ 385/70; 385/7; 385/37; 385/27
(58) Field of Search .................. 385/7, 11, 24, 385/27, 37

(56) References Cited

U.S. PATENT DOCUMENTS

| | | | |
|---|---|---|---|
| 5,218,653 A | | 6/1993 | Johnson et al. ............... 385/11 |
| 5,455,877 A | | 10/1995 | Baran et al. .................. 385/11 |
| 5,459,799 A | * | 10/1995 | Weber ........................... 385/2 |
| 5,652,809 A | * | 7/1997 | Aronson ......................... 385/7 |
| 5,777,793 A | | 7/1998 | Little et al. ................. 359/584 |
| 5,850,492 A | | 12/1998 | Morasca et al. .............. 385/11 |
| 6,021,237 A | * | 2/2000 | Kim et al. .................... 385/28 |
| 6,151,427 A | * | 11/2000 | Satorius ......................... 385/7 |
| 6,233,379 B1 | * | 5/2001 | Kim et al. .................... 385/28 |
| 6,253,002 B1 | * | 6/2001 | Kim et al. .................... 385/27 |
| 6,256,428 B1 | * | 7/2001 | Norwood et al. ............. 385/17 |
| 6,411,411 B1 | * | 6/2002 | Okazaki et al. ............. 398/207 |
| 6,411,748 B1 | * | 6/2002 | Foltzer .......................... 385/7 |
| 2001/0019436 A1 | * | 9/2001 | Nakajima et al. ........... 359/110 |
| 2002/0071173 A1 | * | 6/2002 | Lee et al. ................. 359/337.1 |
| 2003/0086634 A1 | * | 5/2003 | Satorius ......................... 385/7 |

FOREIGN PATENT DOCUMENTS

| | | | |
|---|---|---|---|
| EP | 0887688 | 12/1998 | ........... G02F/1/125 |
| EP | 0938017 | 8/1999 | ........... G02F/1/125 |
| JP | 08-286160 | 11/1995 | |
| JP | 08-114776 | 5/1996 | |
| JP | 08-211349 | 8/1996 | |
| JP | 09-090303 | 4/1997 | |
| JP | 11-064809 | 3/1999 | |

OTHER PUBLICATIONS

Matuschek et al., "Theory of Double–Chirped Mirrors", IEEE Journal of Selected Topics in Quantum Electronics, vol., 4, No. 2, Mar. 1998, pp. 197–208.

Nakazawa et al., "TI: LiNbO$_3$ Acoustic–Optic Tunable Filter (AOTF)", Fujitsu–Scientific and Technical Journal, Fujitsu Limited, Kawasaki, Japan, vol. 35, No. 1, Jul. 1999, pp. 107–112.

Aronson et al., "Reduced Sidelobe Integrated Acousto–Optic Filter with Birefringence apodization", Optics Letters, Optical Society of America, vol. 18, No. 20, Oct. 15, 1993, pp. 1721–1723.

Fukutoku et al., "Wavelength–Division–Multiplexing Add/Drop Multiplexer Employing a Novel Polarisation Independent Acousto–Optic Tunable Filter", Electronics Letters, vol. 29, No. 10, May 13, 1993, pp. 905–907.

* cited by examiner

*Primary Examiner*—John D. Lee
*Assistant Examiner*—Tina M Lin
(74) *Attorney, Agent, or Firm*—Staas & Halsey LLP

(57) ABSTRACT

The present invention aims at providing an optical wavelength filter of band rejection type capable of reliably and stably blocking a light of a desired wavelength from passing through. To this end, the optical wavelength filter of the present invention comprises a plurality of optical filter sections each blocking the light corresponding to the selected wavelength from passing through, the respective optical filter sections being cascade connected to be in a multi-staged structure, wherein the selected wavelengths in the optical filter sections are deviated from one another, to form a blocking band having a wavelength band corresponding to a deviation amount.

31 Claims, 13 Drawing Sheets

FIG.9

| PROPAGATION DIRECTION OF LIGHT AND SAW | WAVELENGTH $\Lambda$ OF SAW SENSED BY LIGHT |
|---|---|
| STATIC (ACOUSTIC VELOCITY = 0) | $\Lambda_0$ — PROPAGATION DIRECTION OF LIGHT |
| FORWARD DIRECTION | $\Lambda_+$ — PROPAGATION DIRECTION OF SAW |
| REVERSE DIRECTION | $\Lambda_-$ ← PROPAGATION DIRECTION OF SAW |

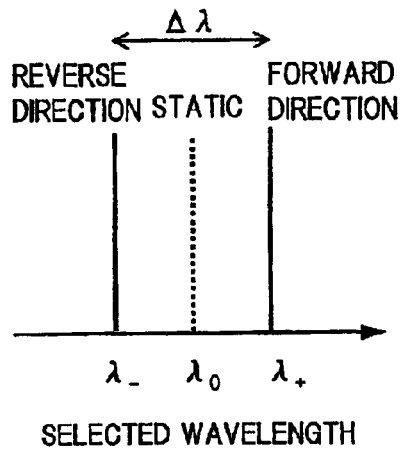

$\Delta\lambda$

REVERSE DIRECTION — STATIC — FORWARD DIRECTION $\lambda_-$  $\lambda_0$  $\lambda_+$

SELECTED WAVELENGTH

CROSS-CONNECTION

PANDA TYPE FIBER

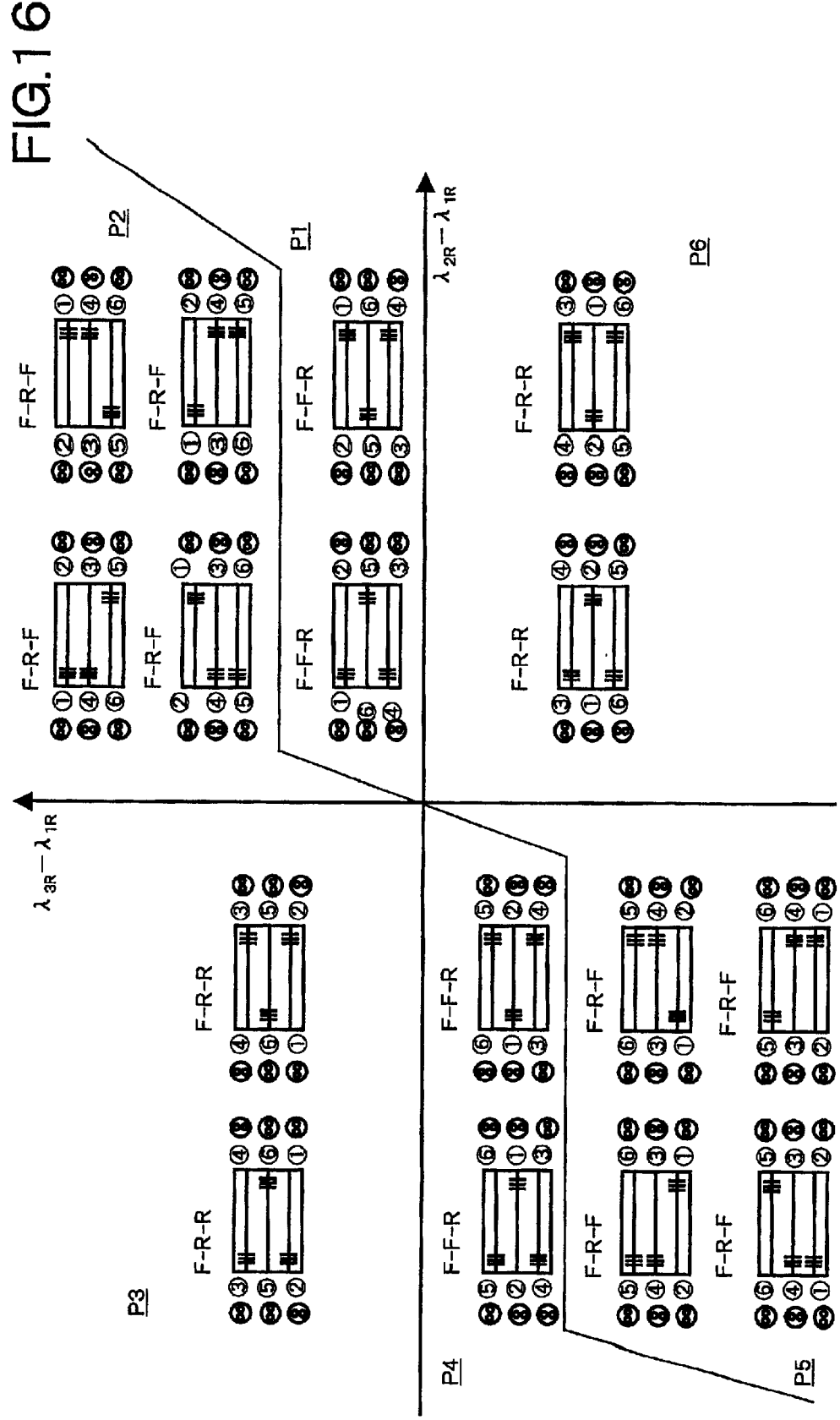

FIG.17
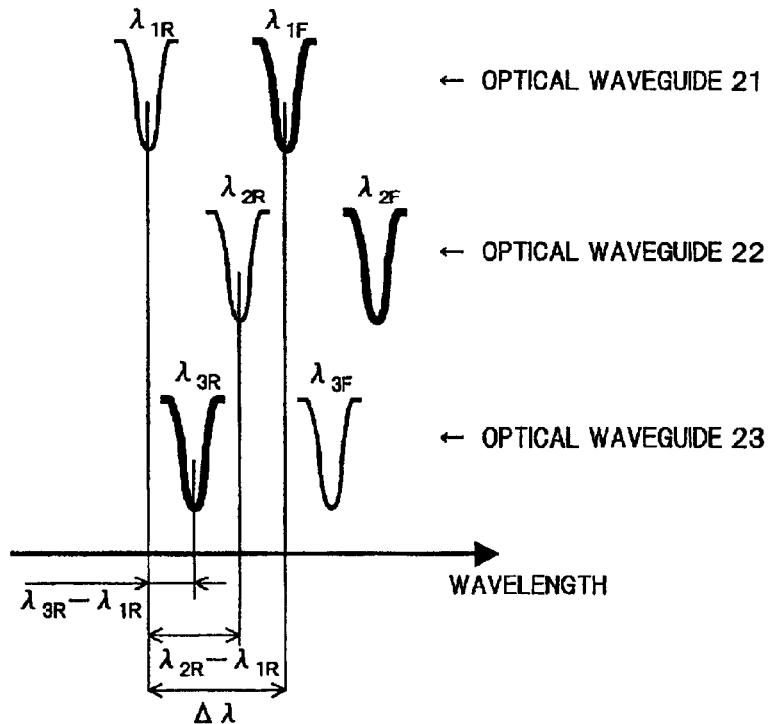
FIG.18A CONCEPTUAL DIAGRAM EXPLAINING CHARACTERISTICS OF REJECTION TYPE OPTICAL WAVELENGTH FILTER
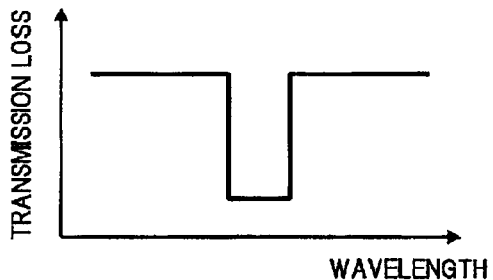
FIG.18B CONCEPTUAL DIAGRAM EXPLAINING CHARACTERISTICS OF REJECTION TYPE OPTICAL WAVELENGTH FILTER
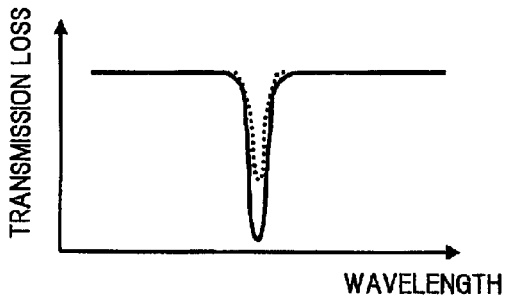

OPTICAL WAVELENGTH FILTER

BACKGROUND OF THE INVENTION

1. Field of the Invention

The present invention relates to an optical wavelength filter to be used for various devices for optical communications, in particular, to an optical wavelength filter of band rejection type in which a plurality of optical filter sections each blocking a light of required wavelength from passing through, are cascade connected to be in a multi-staged structure.

2. Related Art

There have been demanded developments of optical communication systems and optical signal processing systems capable of constructing networks of large capacities and ultra-long distance with an explosive increase of IP data communication demand. In a transmission system adopting a wavelength-division multiplexing (WDM) transmission as a basic technique thereof, it is possible to realize the large capacity transmission and easily perform the division-multiplication with the wavelength as a unit, so that the construction of flexible optical networks that performs multiplication-division of different kinds of services at optical levels, such as, optical cross-connecting (OXC), optical add/drop multiplexing (OADM) and the like. Therefore, the development and manufacturing of transmission apparatus and signal processing apparatus using the above system have been remarkably made.

In these apparatuses, there are used many optical function devices, such as, an optical wavelength filter that separates a signal light for each wavelength, and the like. Specifically, the optical wavelength filter is used, for example, for the wavelength switching in the OXC and OADM, the separation of each wavelength at a receiving section, the ASE cutting, and the like.

By forming the above mentioned optical wavelength filter on a substrate made of $SiO_2$, $LiNbO_3$ and the like, it becomes possible to achieve the high functions, down-sizing, integration, reduction of electricity, and reduction of cost. Further, in a case where a plurality of optical wavelength filters integrated on a substrate are cascade connected, it is possible to achieve the narrow transmission band and the improvement of suppression ratio between other channels during used as band-pass type optical wavelength filters, and also it becomes possible to achieve the improvement of extinction ratio during used as band-rejection type optical wavelength filters (notch filters).

For the wavelength characteristics of the rejection type optical wavelength filter to be used for optical apparatuses, such as OXC, OADM and the like, as mentioned above, for example, as shown in the conceptual diagram of FIG. 18A, it is an ideal to have a filter characteristic that is changed in rectangular, namely, a change in transmissivity from the passing band to the blocking band is steep and also the blocking band has a required width. The multi-staged structure in which the above plurality of optical wavelength filters are cascade connected is considered to be useful as means for achieving the realization of the above described ideal filter characteristics. For example, if acousto-optic tunable filters are used as the optical wavelength filters at respective stages, it is known that, basically, the filter characteristic having an excellent extinction ratio can be obtained, as the number of stages of AOTFs is increased.

However, in a case where the multi-staged structure as described above is adopted, if the wavelengths (selected wavelengths) of lights to be blocked from passing through at the optical wavelength filters at respective stages are all coincident, as shown in the conceptual diagram of FIG. 18B, since the transmissivity becomes minimum at one point, the width of blocking band becomes narrower. For the blocking band of the rejection type optical wavelength filter, a required width needs to be ensured, considering the conditions of, for example, the wavelength width of optical signal corresponding to the spectrum width of light source such as laser, errors in setting or controlling of optical wavelengths filters, or the unstable wavelength of light source. Therefore, according to the filter characteristics as shown in FIG. 18B, it becomes impossible to block the passing of optical signal of desired wavelength even in a case a slight variation is caused in the setting of the optical signal wavelength or the setting of filter.

SUMMARY OF THE INVENTION

The present invention has been achieved in view of the above problems, and an object of the present invention is to provide an optical wavelength filter of band rejection type capable of reliably and stably blocking a light of required wavelength from passing through.

In order to achieve the above object, the present invention provides an optical wavelength filter comprising a plurality of optical filter sections each blocking a light corresponding to a selected wavelength from passing through, the plurality of optical filter sections being cascade connected to be in a multi-staged structure, wherein respective selected wavelengths of the plurality of optical filter sections are deviated from one another, to form a blocking band having the wavelength band corresponding to a deviation amount between the selected wavelengths.

According to the optical wavelength filter as mentioned above, a characteristic in which transmission wavelength characteristics in the optical filter sections at respective stages are overlapped with one another can be obtained in the entire filter, and there is formed a blocking band having the wavelength band corresponding to the deviation amount of selected wavelengths of the respective optical filter sections. Thus, even if the wavelengths of optical signal, the filter setting and the like fluctuate, it is possible to reliably and stably block an optical signal of desired wavelength from passing through. Further, since the plurality of optical filter sections are in the multi-staged structure, it is possible to obtain a filter characteristic having an excellent extinction ratio.

In the above optical wavelength filter, each of the optical filter sections may include an acousto-optic filter that blocks a light corresponding to a selected wavelength from passing through by utilizing the acousto-optic effect. Moreover, as specific means for deviating the selected wavelengths in the respective acousto-optic filters from one another, it is possible to adopt means to differ widths of optical waveguides constituting the respective acousto-optic filters from one another, to give RF signals of different frequencies to the respective acousto-optic filters, to change propagation directions of acousto-waves to propagation directions of lights in the respective acousto-optic filters, or to differ acoustic velocities of respective acousto-wave guides constituting the respective acousto-optic filters.

Further objects, features and advantages of the present invention will become more apparent from the following description of preferred embodiments when read in conjunction with the accompanying drawings.

BRIEF EXPLANATION OF THE DRAWINGS

FIG. 9 is a diagram for explaining the selected wavelength Doppler shift in AOTF in the fifth embodiment;

FIG. 15 is a diagram for explaining the deviation of selected wavelengths inherent to the substrate on which three-staged AOTFs are integrated, in which

FIG. 16 is a schematic view arranging optimum connection relationships in view of an influence of selected wavelength Doppler shift and the like, according to the wavelength deviation patterns in FIG. 15; and FIG. 17 is a diagram showing relationships among the selected wavelengths at respective stages set in the variable wavelength filter in FIG. 10.

FIG. 18 is a conceptual diagram for explaining filter characteristics of an optical wavelength filter of rejection type, in which FIG. 18A shows ideal filter characteristics, and FIG. 18B shows filter characteristics of when the selected wavelengths are coincident with one another in a multi-staged structure;

DETAILED DESCRIPTION OF THE PREFERRED EMBODIMENTS

Embodiments of the present invention will be described based on the drawings.

Figure 1:
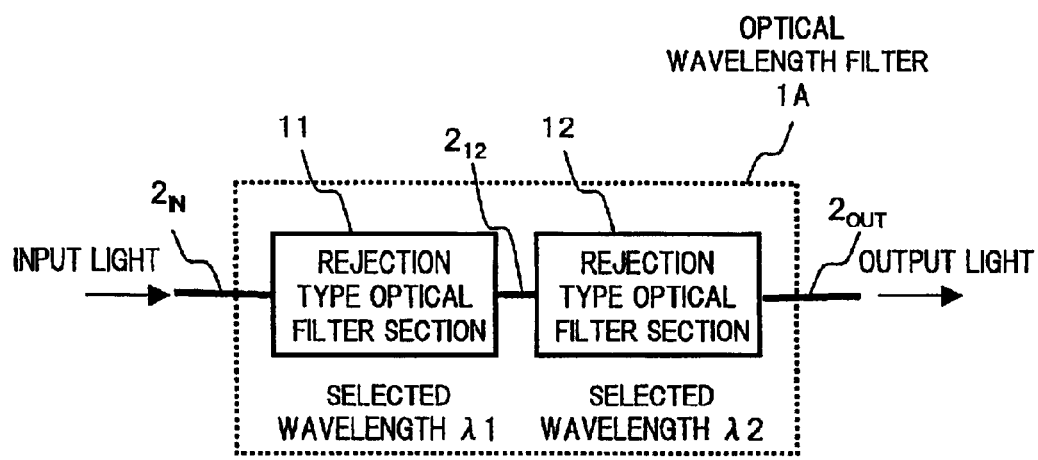
FIG. 1 is a block diagram showing a first embodiment of an optical wavelength filter according to the present invention.

FIG. 1 is a block diagram showing a first embodiment of an optical wavelength filter according to the present invention.

In FIG. 1, an optical wavelength filter 1A is constituted such that, in a two-staged structure in which, for example, two optical filter sections of band rejection type 11 and 12 are cascade connected via a connecting optical path $2_{12}$, selected wavelengths λ1 and λ2 of the optical filter sections 11 and 12 are set to be deviated from each other. Further, an input optical path $2_{IN}$ that guides an input light from the outside to the optical filter section 11 at former stage, and an output optical path $2_{OUT}$ that guides an output light from the optical filter section 12 at latter stage to the outside, are connected to the optical wavelength filter 1A, respectively.

As each of the optical filter sections 11 and 12, there may be used a known optical filter of band rejection type that polarization mode coverts only a required selected wavelength by utilizing, for example, the acousto-optic effect, electro-optic effect, photoelastic effect or the like, and polarization splits the converted light to block the passing thereof. Specific examples of the respective optical filter sections will be described later.

The selected wavelengths λ1 and λ2 of the optical filter sections 11 and 12 are set to be deviated, by a required amount, from the center wavelength of an optical signal to be blocked from passing through the present optical wavelength filter 1A, in view of conditions of the spectrum width of the optical signal, errors in setting or controlling of the optical wavelength filter, or the unstable wavelength of light source. A specific setting method of selected wavelengths in the respective optical filter sections will be described later.

Figure 2:
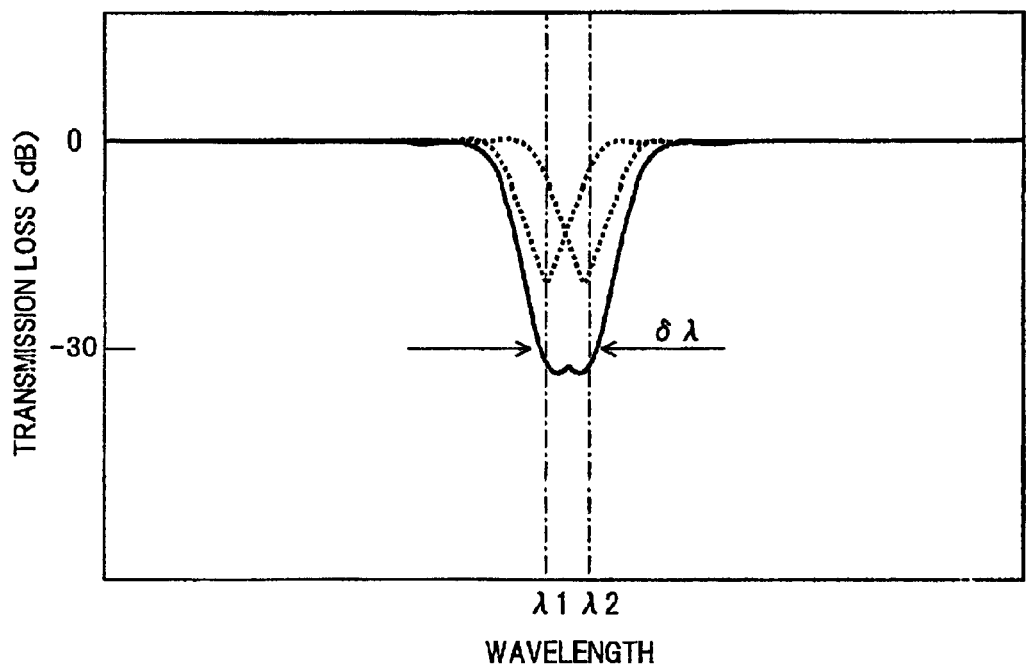
FIG. 2 is a diagram showing a transmission wavelength characteristic of the optical wavelength filter in FIG. 1.

In the optical wavelength filter 1A having such a constitution, for example, as shown in FIG. 2, a characteristic (a solid line in the figure) in which transmission wavelength characteristics (dotted lines in the figure) in the optical filter sections 11 and 12 of respective stages are overlapped with each other, can be obtained in the entire filter, and there is formed a blocking band having the wavelength band δλ corresponding to a deviation amount between the selected wavelengths λ1 and λ2 of the respective optical filter sections 11 and 12.

When a WDM signal light including a plurality of optical signals of different wavelengths is input from the outside, via the input optical path $2_{IN}$, to the optical wavelength filter 1A having such a filter characteristic as described above, the input light is sent to the optical filter section 11, connecting optical path $2_{12}$ and optical filter section 12, sequentially, so that an optical signal of wavelength within the blocking band is blocked from passing through, while optical signals of wavelengths outside of the blocking band are output to the outside via the output optical path $2_{OUT}$.

In this way, according to the present optical wavelength filter 1A, for example, even if the wavelengths of optical signals included in the input light, the filter setting and the like fluctuate, due to a change in temperature, a change with time lapse and the like, since the blocking band having the wavelength band δλ is formed, it is possible to reliably and stably block an optical signal of a desired wavelength from passing through. Further, since two optical wavelength filter sections 11 and 12 of band rejection type are cascade connected to be in a two-staged structure, a filter characteristic having an excellent extinction ratio can be obtained.

Next, a second embodiment of an optical wavelength filter according to the present invention will be described.

Figure 3:
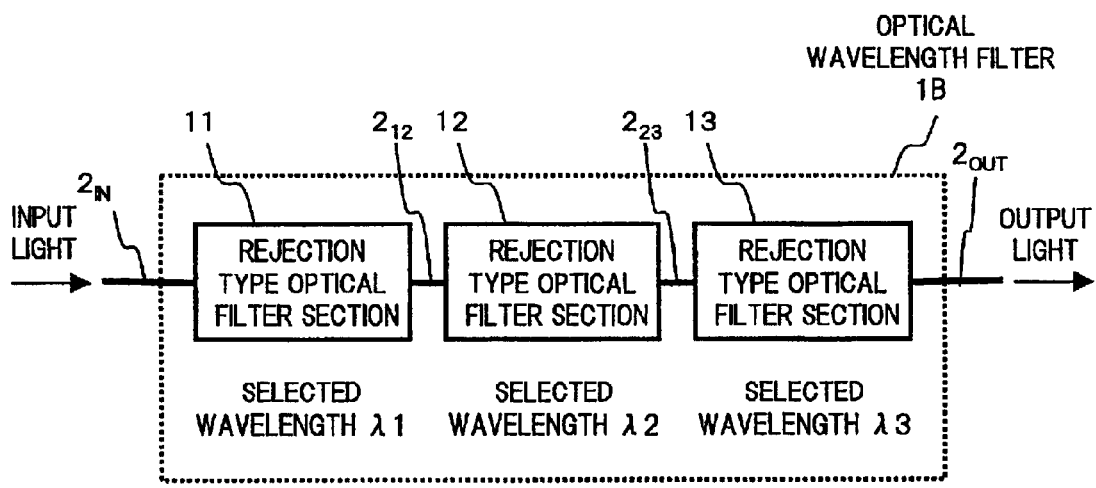
FIG. 3 is a block diagram showing a second embodiment of an optical wavelength filter according to the present invention.

FIG. 3 is a block diagram showing an optical wavelength filter of the second embodiment. Same components as those in the first embodiment shown in FIG. 1 are denoted by the same reference numerals and the descriptions thereof shall be omitted. Same rules shall be applied to the other embodiments.

In FIG. 3, an optical wavelength filter 1B in the second embodiment corresponds to a case where, for example, three optical wavelength filter sections 11, 12 and 13 of band rejection type are cascade connected. Specifically, in a three-stage structure in which the optical filter section 11 at first stage and the optical filter section 12 at second stage are connected to each other by a connecting optical path $2_{12}$, and the optical filter section 12 at second stage and the optical filter section 13 at third stage are connected to each other by a connecting optical path $2_{23}$, selected wavelengths λ1, λ2 and λ3 of the optical wavelength filter sections 11, 12 and 13 are set to be deviated from one another. Also, an input optical path $2_{IN}$ that guides an input light from the outside to the first stage optical filter section 11 and an output optical path $2_{OUT}$ that guides an output light from the third stage optical filter section 13 are connected to the optical wavelength filter 1B, respectively.

Figure 4:
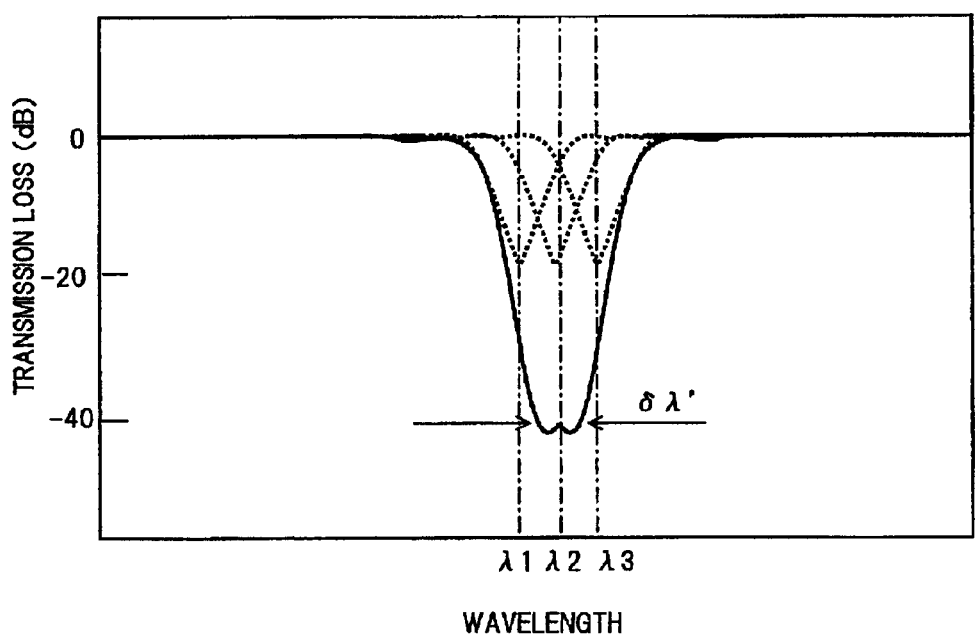
FIG. 4 is a diagram showing a transmission wavelength characteristic of the optical wavelength filter in FIG. 3.

In the optical wavelength filter 1B having such a constitution, for example, as shown in FIG. 4, a characteristic (a solid line in the figure) in which transmission wavelength characteristics (dotted lines in the figure) in the optical filter sections 11 to 13 at respective stages are overlapped with one another, can be obtained in the entire filter. Herein, it is assumed that, for example, the selected wavelengths at respective stages are set so as to be in a relationship of λ1<λ2<λ3, and there is formed a blocking band having the wavelength band δλ' corresponding to a deviation amount between the selected wavelengths λ1 and λ2.

According to the optical wavelength filter 1B, as in the first embodiment, even if the wavelengths of optical signals included in the input light, the filter setting and the like fluctuate, since the blocking band having the wavelength band δλ' is formed, it is possible to reliably and stably block an optical signal of a desired wavelength from passing through. Further, since three optical wavelength filter sections 11 to 13 of band rejection type are cascade connected to be in a three-staged structure, a filter characteristic having an excellent extinction ratio can be obtained.

In the above first or second embodiment, there has been shown two or three optical filter sections are cascade connected. However, the present invention is not limited thereto, and it is possible to apply the optical wavelength filter of the present invention to a case where four or more optical filter sections are cascade connected, in the same manner as described above.

Next, there will be described a third embodiment of an optical wavelength filter according to the present invention.

Figure 5:
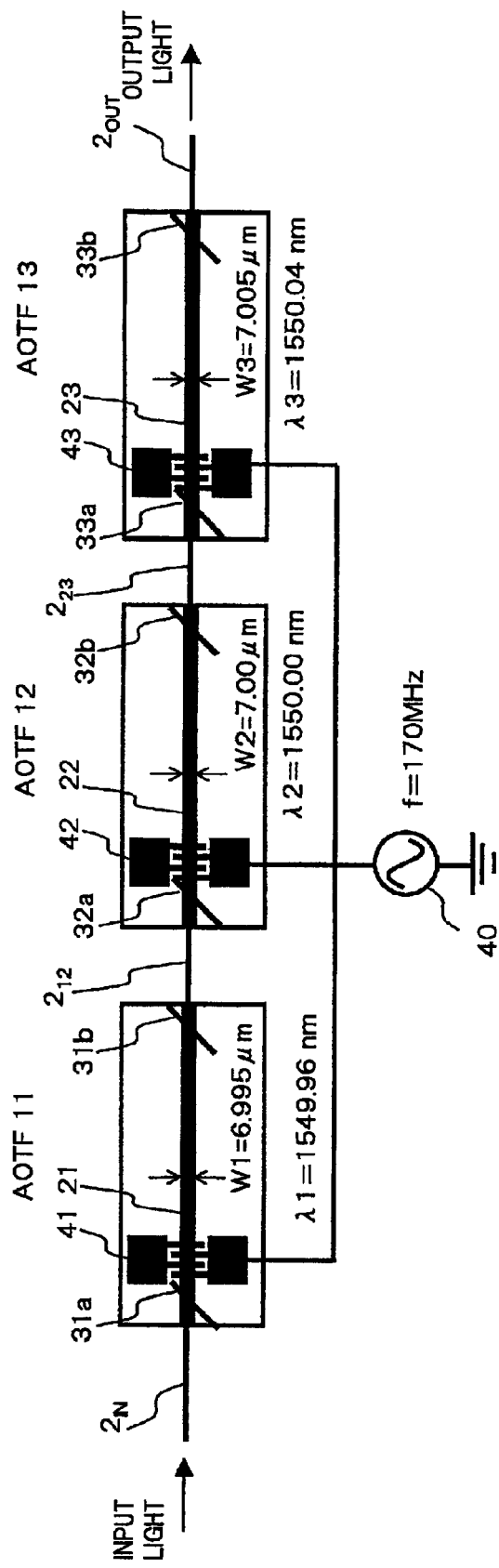
FIG. 5 is a block diagram showing a third embodiment of an optical wavelength filter according to the present invention.

FIG. 5 is a block diagram showing an optical wavelength filter of the third embodiment.

In FIG. 5, the present optical wavelength filter is constituted such that, for the constitution of the second embodiment, acousto-optic tunable filters (AOTFs) are used as the optical filter sections 11 to 13 at respective stages, and the widths of optical waveguides 21 to 23 constituting the AOTFs 11 to 13 are made to differ from one another, to deviate the selected wavelengths λ1 to λ3 of the AOTFs 11 to 13 from one another.

The AOTFs 11 to 13 include polarization beam splitters (PBSs) 31a, 31b to 33a, 33b on both ends of optical waveguides 21 to 23 formed on a substrate, respectively, and interdigital transducers (IDTs) 41 to 43 each generating a surface acoustic wave (SAW) are provided on the substrate. As the respective PBSs 31a, 31b to 33a, 33b, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type. Note, PBSs 31a, 31b to 33a, 33b may be constituted to be of TM mode transmission type. The respective IDTs 41 to 43 are applied commonly with a signal of required frequency f generated by an RF signal generating circuit 40, to generate SAWs, respectively. The SAWs generated by the respective IDTs 41 to 43 are guided by SAW guides (not shown), to be propagated along the respective optical waveguides 21 to 23. Note, herein, the IDTs 41 to 43 are set to be arranged on an optical input sides on the optical waveguides 21 to 23, so that the SAWs are propagated in the same directions (forward directions) as the optical signals being propagated within the respective optical waveguides.

Figure 6:
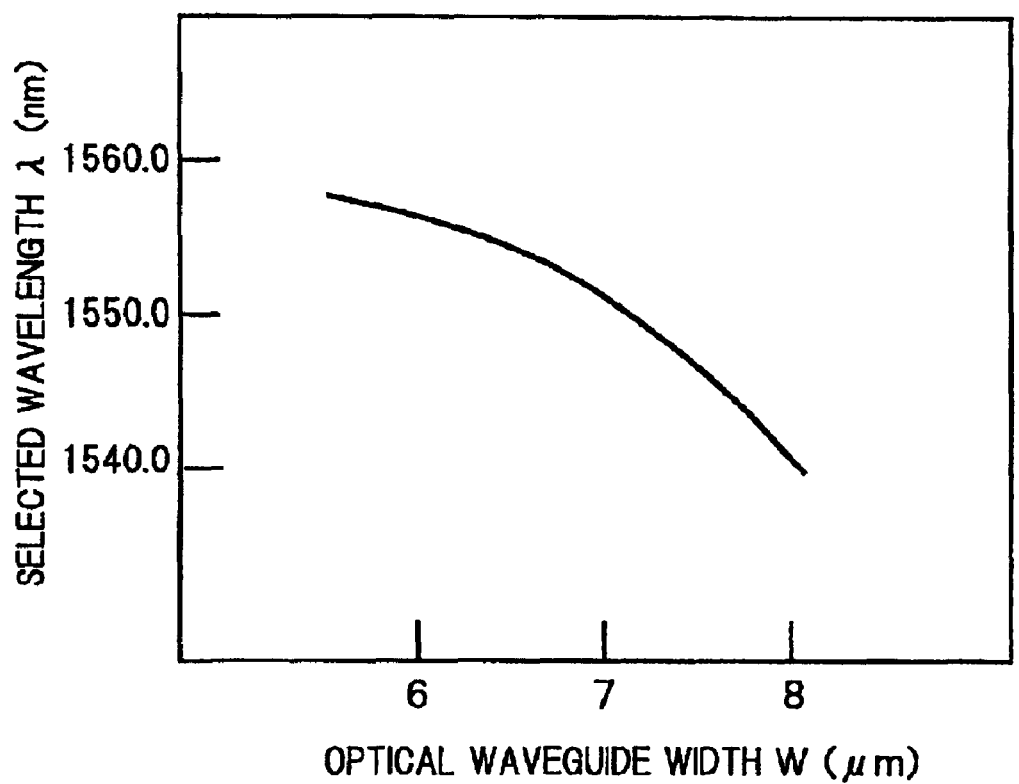
FIG. 6 is a diagram showing a relationship of selected wavelength to an optical waveguide width in the third embodiment.

In the optical wavelength filter having the above constitution, for example, if an RF signal of frequency f=170 MHz is commonly applied to the IDTs 41 to 43, the selected wavelengths λ1, λ2 and λ3 in the AOTFs 11 to 13 at respective stages are made to differ from one another, in accordance with a relationship of selected wavelengths to the optical waveguide widths as shown in FIG. 6. To be specific, for example, in a case where the width W1 of the optical waveguide 21 is set to 6.995 μm, the width W2 of the optical waveguide 22 to 7.00 μm, and the width W3 of the optical waveguide 23 to 7.005 μm, the selected wavelength λ1 in the first stage AOTF 11 is 1549.96 nm, the selected wavelength λ2 in the second stage AOTF 12 is 1550.00 nm, and the selected wavelength λ3 in the third stage AOTF 13 is 1550.04 nm. Note, the settings of RF signal frequency f and optical waveguide widths W1 to W3 are not limited to the above example.

In this way, by previously designing the optical waveguide widths W1 to W2 in the AOTFs 11 to 13 to differ from one another, it is possible to deviate the selected wavelengths λ1 to λ3 at respective stages from one another. Therefore, a blocking band having the wavelength band δλ' corresponding to a deviation amount between the selected wavelengths λ1 and λ3 is formed as same as in FIG. 4. Thus, it becomes possible to reliably and stably block an optical signal of a desired wavelength from passing through, to realize a variable wavelength filter of rejection type having an excellent extinction ratio.

Next, there will be described a fourth embodiment of an optical wavelength filter according to the present invention.

Figure 7:
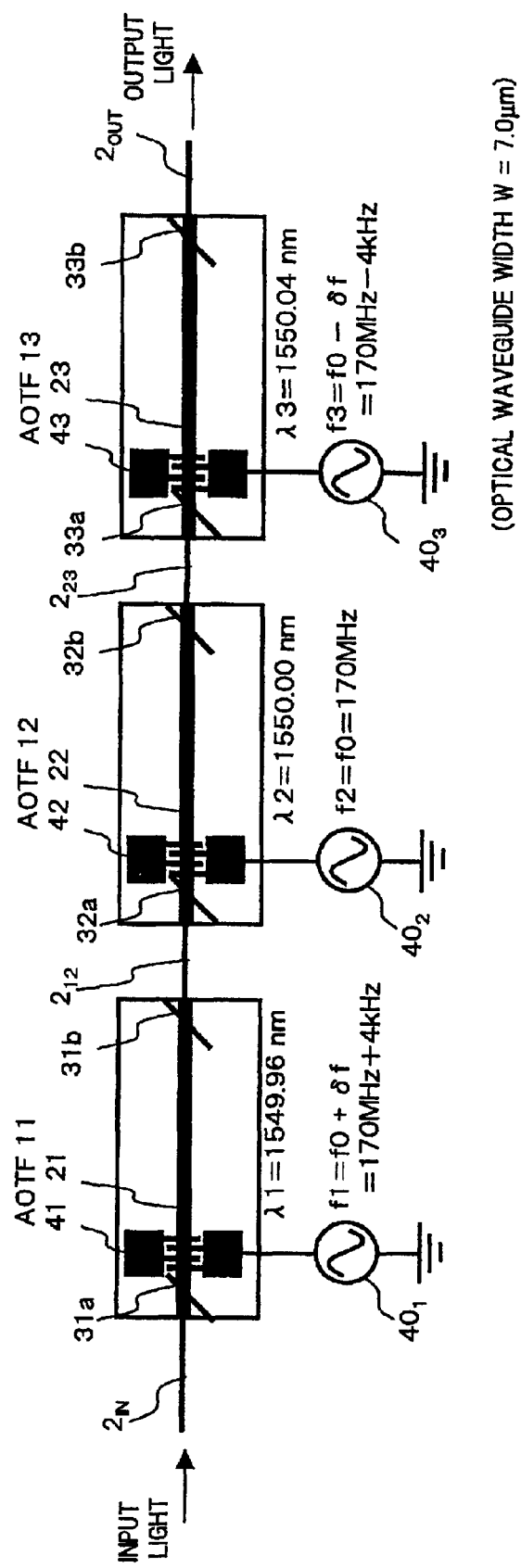
FIG. 7 is a block diagram showing a fourth embodiment of an optical wavelength filter according to the present invention.

FIG. 7 is a block diagram showing an optical wavelength filter of the fourth embodiment.

In FIG. 7, the present optical wavelength filter is constituted such that, for the constitution of the third embodiment, instead of differing the optical waveguide widths in the AOTFs 11 to 13 at respective stages from one another, frequencies of RF signals to be applied to the IDTs 41 to 43 are made to differ from one another, to deviate the selected wavelengths λ1 to λ3 in the AOTFs 11 to 13 from one another.

Specifically, the optical waveguides in the AOTFs 11 to 13 at respective stages are made to be the same width W, and at the same time, RF signal generating circuits $40_1$ to $40_3$ are provided, respectively, corresponding to the IDTs 41 to 43 at respective stages, so that frequencies of the RF signal generating circuits $40_1$, $40_2$ and $40_3$ are set to f1=f0+δf, f2=f0 and f3=f0−δf, respectively.

For example, if the respective RF signals of frequencies f1 to f3 generated by the RF signal generating circuits $40_1$ to $40_3$ are applied to the corresponding IDTs 41 to 43 assuming that the optical waveguide width is W=7.0 μm, and the setting of frequency is f0=170 MHz and δf=4 kHz, the selected wavelength λ1 in the first stage AOTF 11 is 1549.96 nm, the selected wavelength λ2 in the second stage AOTF 12 is 1550.00 nm, and the selected wavelength λ3 in the third stage AOTF 13 is 1550.04 nm. Note, the settings of optical waveguide widths and RF signal frequencies f1 to f3 are not limited to the above example.

In this way, by previously designing the frequencies f1 to f2 of RF signals to be given to the AOTFs to differ from one another, it is also possible to deviate the selected wavelengths λ1 to λ3 at respective stages from one another. Thus, it is possible to obtain the same functions and effects as for the case of the third embodiment.

Next, there will be described a fifth embodiment of an optical wavelength filter according to the present invention.

Figure 8:
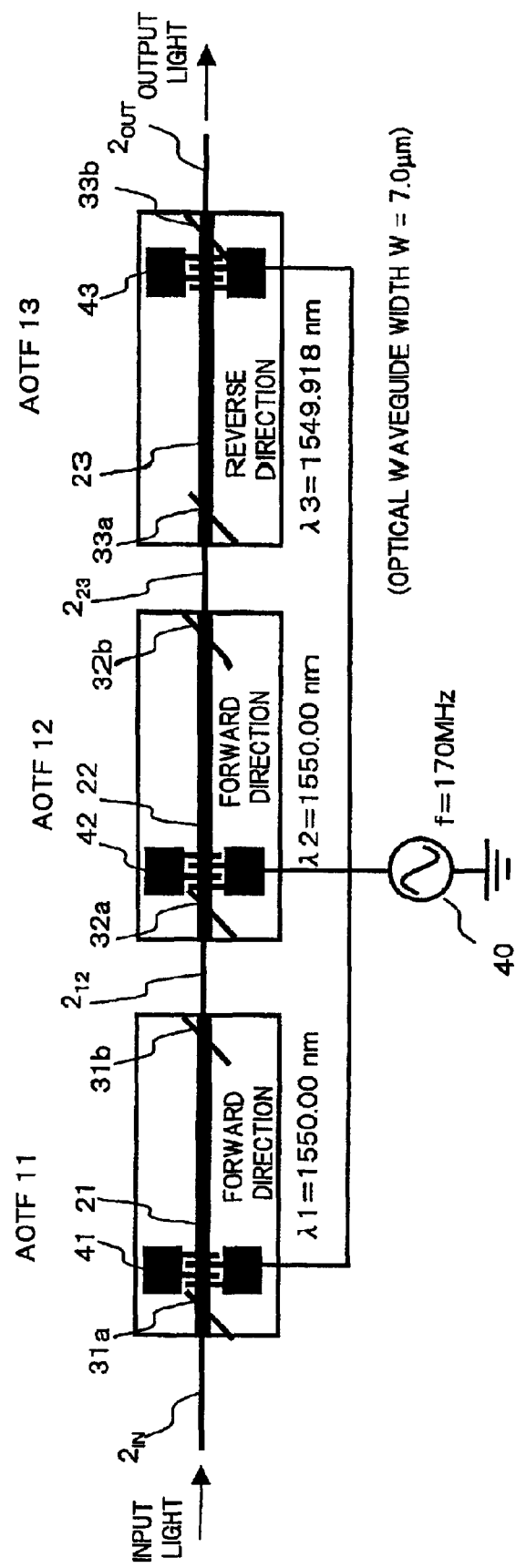
FIG. 8 is a block diagram showing a fifth embodiment of an optical wavelength filter according to the present invention.

FIG. 8 is a block diagram showing an optical wavelength filter of the fifth embodiment.

In FIG. 8, the present optical wavelength filter is constituted such that, for the constitution of the third embodiment, instead of differing the optical waveguide widths in the AOTFs 11 to 13 at respective stages from one another, for example, the propagation directions of SAWs are made to be forward to the light propagation directions in the first and second stage AOTFs 11 and 12, and the propagation direction of SAW is made to be opposite to the light propagation direction in the third stage AOTF 13, so that the selected wavelength λ3 in the AOTF 13 is deviated from the selected wavelengths λ1 to λ2 in the AOTFs 11 and 12, due to the selected wavelength Doppler shift to be described in the following.

Here, the selected wavelength Doppler shift will be described.

The selected wavelength Doppler shift is a phenomenon in which the wavelengths of the light to be polarization mode converted become different from one another due to the acousto-optic effect, depending on a relationship between the propagation direction of light within the optical waveguide and that of SAW transmitted along that optical waveguide. This phenomenon is caused by the same theory as that of typically known Doppler shift, and in the above case, it can be considered that the wavelength (frequency) of SAW viewed from the light is changed. Accordingly, for example, as shown in FIG. 9, if the propagation direction of light is the same forward direction as the propagation direction of SAW, the wavelength of SAW sensed by the light becomes longer. On the contrary, if the propagation direction of light is the reverse direction to the propagation direction of SAW, the wavelength of SAW sensed by the light becomes shorter. The selected wavelength λ in a case of influenced by such a Doppler shift, can be represented by the following equation (1);

$$\lambda = \frac{\lambda_0}{1 - v/c} \quad (1)$$

wherein $\lambda_0$ is the selected wavelength in a case where SAW is static, v is a speed of SAW, and c is an average speed of light in the optical waveguide.

Accordingly, a selected wavelength difference Δλ caused by whether the propagation directions of the light and SAW are forward directions or reverse directions can be represented by the following equation (2).

$$\Delta\lambda = 2 \cdot \lambda_0 \cdot \frac{v/c}{1 - (v/c)^2} \quad (2)$$

In the constitution of the optical wavelength filter shown in FIG. 8, a selected wavelength difference Δλ due to the above selected wavelength Doppler shift is caused between the selected wavelengths λ1 and λ2 in the AOTFs 11 and 12, and the selected wavelength λ3 in the AOTF 13. Specifically, for example, if the frequency f of RF signal is set to 170 MHz and the optical waveguide width W in each of the AOTFs 11 to 13 is set to 7.0 μm, each of the selected wavelengths λ1 and λ2 in the AOTFs 11 and 12 is 1550.00 nm, and the selected wavelength λ3 in the AOTF 13 is 1549.918 nm. Note, the settings of optical waveguide widths and RF signal frequency f are not limited to the above example.

In this way, it is possible to previously design the propagation directions of SAWs to the light propagation directions in the AOTFs 11 to 13 at respective stages to be changed, to deviate the selected wavelengths at respective stages from one another by utilizing the selected wavelength Doppler shift. In the constitutional example in FIG. 8, a blocking band having the wavelength band corresponding to a deviation amount between the selected wavelength λ1=λ2, and the selected wavelength λ3 is formed. Thus, it becomes possible to reliably and stably block an optical signal of a desired wavelength from passing through, to realize a variable wavelength filter of rejection type having an excellent extinction ratio.

In the fifth embodiment, since the selected wavelength λ3 is deviated by utilizing the selected wavelength Doppler shift and the selected wavelength λ1 and λ2 are made to be the same value, the wavelength width of the blocking band is narrower than those in the third and fourth embodiments. However, for example, by differing the optical waveguide widths in the AOTFs 11 and 12 from each other as in the third embodiment, or by differing the frequencies of RF signals to be given to the AOTFs 11 and 12 from each other as in the fourth embodiment, it is possible to deviate the selected wavelengths λ1 and λ2 from each other to widen the wavelength width of blocking band. In this way, the optical wavelength filter of the present invention also includes such a constitution that the constitutions in the third to fifth embodiments are appropriately combined with one another, to deviate the selected wavelengths λ1 to λ3 in the AOTFs 11 to 13 at respective stages from one another.

Furthermore, for the SAW guides at respective stages (not shown in the third to fifth embodiments), it is possible to differ the speeds of SAWs (acoustic velocities) being propagated through respective guides from one another, to deviate the selected wavelengths λ1 to λ3 in the AOTFs 11 to 13 at respective stages from one another.

Here, a specific embodiment of the optical wavelength filter according to the present invention will be described in detail. In the following, a variable wavelength filter of rejection type embodied by cascade loop connecting three AOTFs on the same substrate is considered, as one example.

Figure 10:
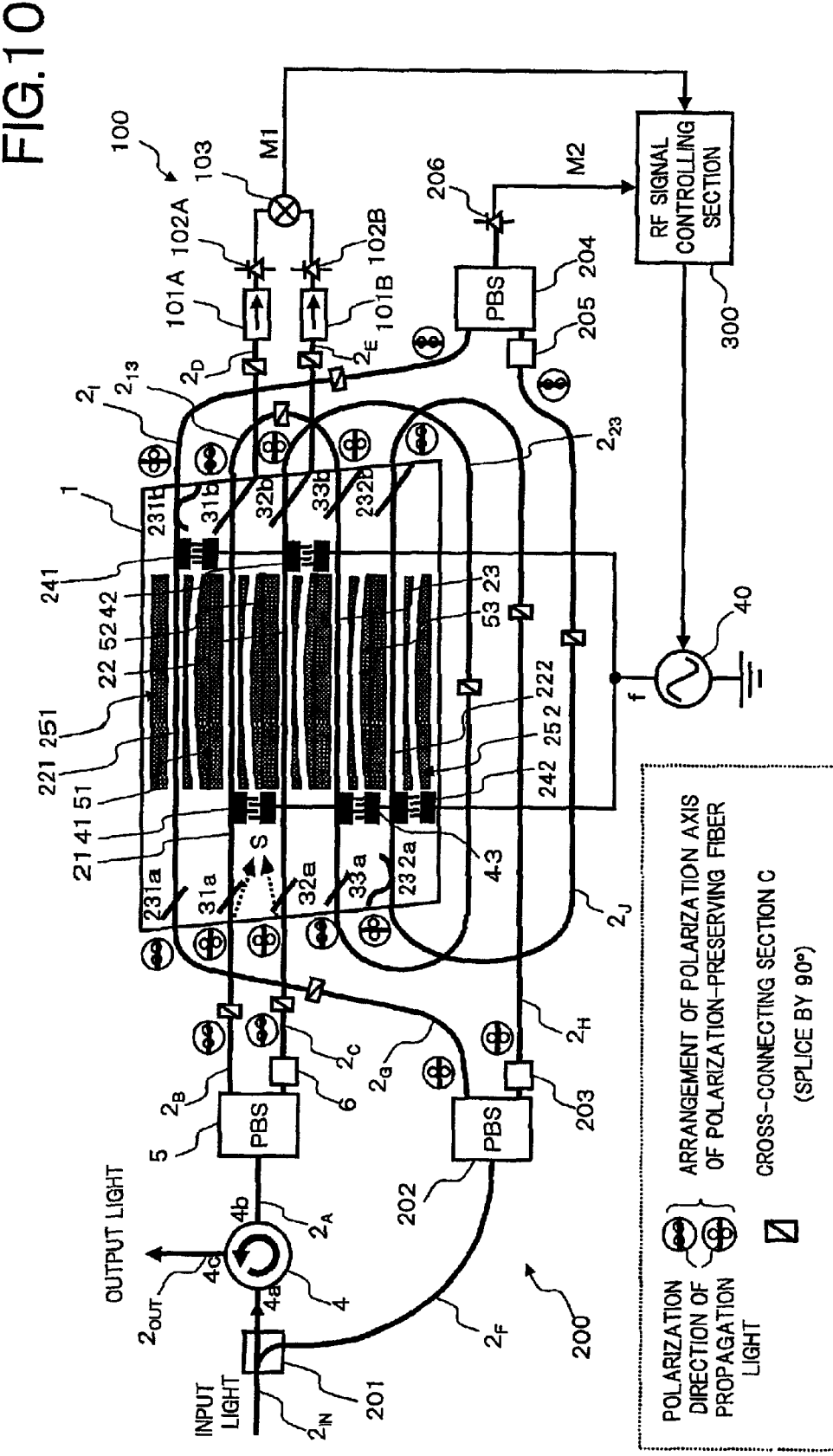
FIG. 10 is a block diagram showing a more specific embodiment of an optical wavelength filter according to the present invention.

FIG. 10 is a plan view showing the constitution of the variable wavelength filter according to the above embodiment.

In the variable wavelength filter shown in FIG. 10, for example, three AOTFs formed on the same substrate 1 are connected to one another by means of connecting optical paths $2_{13}$ and $2_{23}$, as optical filter sections 11 to 13. Optical input and output portions of the connected AOTFs on the same substrate 1 are connected to the input optical path $2_{IN}$ and the output optical path $2_{OUT}$ by using an optical circulator 4, a polarization beam splitter (PBS) 5, a polarization rotating section 6 and connecting optical paths $2_A$, $2_B$, $2_c$, so that the three AOTFs on the substrate 1 are cascade connected in a loop.

Further, the present variable wavelength filter is provided with a first monitoring section 100 that monitors a dropped light blocked from passing through by a required AOTF, so as to perform a tracking control of the operation states of the AOTFs cascade loop connected on the substrate 1. Moreover, the present variable wavelength filter is provided with a second monitoring section 200 that monitors the lights passed through monitoring AOTFs on the substrate 1, which operate in accordance with the parameter same as for the AOTFs, in order to previously detect a control value of the AOTFs cascade loop connected on the substrate 1, at the starting, the alteration of setting or the like, of the present variable wavelength filter. The monitoring results of the first and second monitoring sections 100 and 200 are sent to an RF signal controlling section 300 that controls RF signals to be given to the respective AOTFs, to control the operation states of AOTFs.

The substrate 1 is constituted such that five optical waveguides 21, 22, 23, 221 and 222 substantially parallel with one another are formed on a substrate material made of, for example, LiNbO$_3$. The optical waveguides 21 to 23 are used for the main signal, and the optical waveguides 221 and 222 are used for the second monitoring section 200. The respective optical waveguides 21, 22, 23, and 221, 222 are provided with polarization beam splitters (PBS) 31a, 31b, 32a, 32b, 33a, 33b, and 231a, 231b, 232a, 232b, respectively, at both end portions thereof. Also, the substrate 1 is formed with interdigital transducers (IDT) 41, 42, 43, and 241, 242, and SAW guides 51, 52, 53, and 251, 252, corresponding to the optical waveguides 21, 22, 23, and 221, 222, respectively.

As the respective PBSs 31a, 31b, 32a, 32b, 33a and 33b for main signal, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type. Further, as the respective PBSs 231a, 231b, 232a and 232b for the second monitoring section 200, it is possible to use, for example, PBSs of crossing waveguide type and the like. However, herein, input and output ports of the PBSs 231a and 232b positioned at the crossing sides of the crossing waveguides are connected to the optical waveguides, respectively, so that the PBSs 231a and 232b are constituted to be of TE mode transmission type, while input and output ports of the PBSs 231b and 232a positioned at the bar sides of the crossing waveguides are connected to the optical waveguides, respectively, so that the PBSs 231b and 232a are constituted to be of TM mode transmission type.

The respective IDTs 41 to 43, 241 and 242 are applied commonly with a signal of required frequency f generated by an RF signal generating circuit 40, to generate surface acoustic waves (SAW), respectively, on the substrate 1. Note, as will be described later, positions of the respective IDTs 41 to 43, 241 and 242 are preferably set such that relationships between the propagation directions of SAWs and the propagation directions of lights within the corresponding optical waveguides are those taking into account of influences of selected wavelength Doppler shift and the like.

The SAW guides 51 to 53, 251 and 252 are those for propagating respective SAWs generated at the IDTs 41 to 43, 241 and 242 through the optical waveguides 21 to 23, 221 and 222, respectively. Here, a case is shown where, for example, SAW guides of directional coupling type formed in required shape by Ti diffusion are used, as the SAW guides 51 to 53, 251 and 252.

In the AOTF using the SAW guides of directional coupling type, SAWs generated at the IDTs are directionally coupled by the SAW guides of required shape, so that SAWs most strongly interfere the light being propagated through the optical waveguide in the vicinity of the center of mode conversion area. Thus, it is possible to achieve the suppression of side lobe level in the filter characteristics of AOTF. Note, in the SAW guides shown in FIG. 10, curving shapes are adopted in order to directionally couple SAWs in accordance with a further desired function. In this way, it becomes possible to suppress further effectively the side lobe level.

Here, the case is shown where the AOTF using the SAW guides of directional coupling type is used. However, the present invention is not limited thereto, and it is possible to use AOTF and the like formed with SAW guides of thin film type on the optical waveguides. Further, for the AOTF using the SAW guides of thin film type, the arrangement may be such that the longitudinal direction of each SAW guide is inclined by a required amount to the axial direction of the optical waveguide so that the propagation axis of SAW and the optical axis cross each other at an inclined angle. By adopting such an arrangement, the intensity of surface acoustic wave sensed by the light is weighted in the longitudinal direction. Thus, it becomes possible to achieve the suppression of side lobe level.

The optical circulator 4 is a typical optical component that includes at least three ports 4a, 4b and 4c, and transmits the light only in a direction from the port 4a to port 4b, from the port 4b to port 4c, and from the port 4c to port 4a. This optical circulator 4 is connected with the input optical path $2_{IN}$, the connecting optical path $2_A$ to be connected to a PBS 5, and the output optical path $2_{OUT}$, to the port 4a, port 4b, and port 4c, respectively.

The PBS 5 splits an input light sent from the port 4b of the optical circulator 4 via the connecting optical path $2_A$ into two polarization lights with polarization planes thereof being orthogonal to each other, to output one of the two polarization lights to one end of the connecting optical path $2_B$, while outputting the other polarization light to one end of the connecting optical path $2_c$. The other end of the connecting optical path $2_B$ is connected to the PBS 31a positioned on the optical waveguide 21 of the substrate 1, and the other end of the connecting optical path $2_c$ is connected to the PBS 32a positioned on the optical waveguide 22 of the substrate 1. Also, herein, a polarization rotating section 6 is inserted onto the connecting optical path $2_c$. The polarization rotating section 6 has a function for rotating the polarization plane of the other polarization light split by the PBS 5 by 90 degrees.

The PBS 31b positioned on the optical waveguide 21 of the substrate 1 is connected to the PBS 33b positioned on the optical waveguide 23 by the connecting optical path $2_{13}$. Further, the PBS 32b positioned on the optical waveguide 22 of the substrate 1 is connected to the PBS 33a positioned on the end portion of the optical waveguide 23 by the connecting optical path $2_{23}$. Thus, the three AOTFs for main signal on the substrate 1 are cascade connected in a loop between the input optical path $2_{IN}$ and the output optical path $2_{OUT}$.

Figure 11:
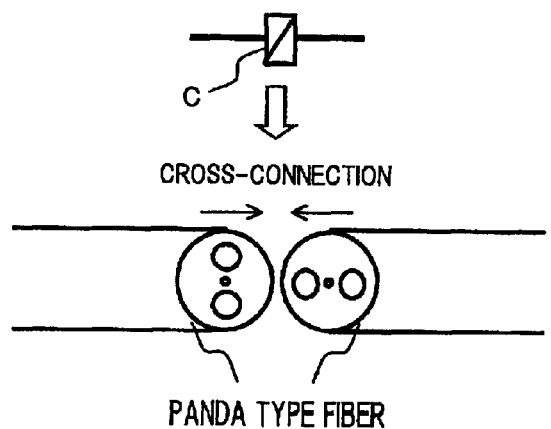
FIG. 11 is a diagram for explaining the cross-connection of connecting optical paths in the variable wavelength filter of FIG. 10.

The connecting optical paths $2_B$, $2_C$, $2_{13}$ and $2_{23}$ are polarization-preserving fibers, and here, for example, PANDA type fibers are used. However, the structure of polarization-preserving fiber is not limited to the PANDA type fiber, and it is possible to adopt a known structured fiber. Further, each of the connecting optical paths $2_B$, $2_C$, $2_{13}$ and $2_{23}$ includes a cross-connecting section C spliced by rotating the polarization axis substantially by 90 degrees as shown in FIG. 11, and suppresses an influence due to the deviation of polarization axis of when connecting an optical device having polarization dependence by the polarization-preserving fiber, as described later.

Moreover, the first monitoring section 100 connected to the substrate 1 comprises an optical isolator 101A and a light receiver 102A for monitoring a dropped light from the lights sequentially passing in one direction through the respective AOTFs cascade loop connected to one another, an optical isolator 101B and a light receiver 102B for monitoring a dropped light from the lights sequentially passing in the other direction through the respective AOTFs cascade loop connected to one another, and a circuit 103 that adds up output signals photo-electrically converted by the light receivers 102A and 102B, to output a monitor signal M1.

Here, an input port of the optical isolator 101A is connected to a TM mode output port of the PBS 31b on the substrate 1 via a connecting optical path $2_D$, while an input port of the optical isolator 101B is connected to a TM mode output port of the PBS 32 on the substrate 1 via a connecting optical path $2_E$. As described later, it is desirable to set a position for monitoring the dropped signal for the light in each direction to an AOTF stage wherein the selected wavelength (dropped wavelength) is positioned at the center of blocking band, considering an influence of dithering to be given to the RF signal.

Further, the second monitoring section 200 connected to the substrate 1 includes an optical coupler 201 on the input optical path $2_{IN}$ that branches a part of the input light by a required branching ratio (for example, 10:1 and the like), a PBS 202 that polarization splits the branched light from the optical coupler 201 to send the split lights to the respective monitoring AOTFs on the substrate 1, a PBS 204 that multiplexes the polarization lights passed through the monitoring AOTFs on the substrate 1, and a light receiver 206 that converts the monitor light multiplexed by the PBS 204 into an electrical signal, to thereby output a monitor signal M2.

The PBS 202 splits the branched light sent from the optical coupler 201 via a connecting optical path $2_F$ into two polarization lights with polarization planes thereof being orthogonal to each other, and outputs one of the polarization lights to one end of a connecting optical path $2_G$, while outputting the other polarization light to one end of a connecting optical path $2_H$. The other end of the connecting optical path $2_G$ is connected to a PBS 231a positioned on the optical waveguide 221 of the substrate 1, and the other end of the connecting optical path $2_H$ is connected to a PBS 232b positioned on the optical waveguide 222 of the substrate 1. Also, herein, a polarization rotating section 203 is inserted onto the connecting optical path $2_H$. The polarization rotating section 203 has a function for rotating the polarization plane of the other polarization light split by the PBS 202 by 90 degrees.

The PBS 204 multiplexes the polarization lights with polarization planes thereof being orthogonal to each other, passed through the monitoring AOTFs on the substrate 1 to be sent via respective connecting optical paths $2_I$ and $2_J$, to output the multiplexed light to the light receiver 206. Specifically, a TM mode light output from a PBS 231b on the optical waveguide 221 of the substrate 1 is input to the PBS 204 through the connecting optical path $2_I$, and at the same time, a TM mode light output from a PBS 232a on the optical waveguide 222 of the substrate 1 passes through the connecting optical path $2_J$ and is rotated with polarization plane thereof by 90 degrees at a polarization rotating section 205, to be input to the PBS 204.

For the respective connecting optical paths $2_D$, $2_E$, $2_G$, $2_H$, $2_I$ and $2_J$ used in the first and second monitoring sections 100 and 200, for example, optical paths of polarization-preserving type such as PANDA type fiber are used, and each optical path includes, in the vicinity of the center in the longitudinal direction, the cross-connecting section C of the same structure as in the above mentioned FIG. 11.

Figure 12:
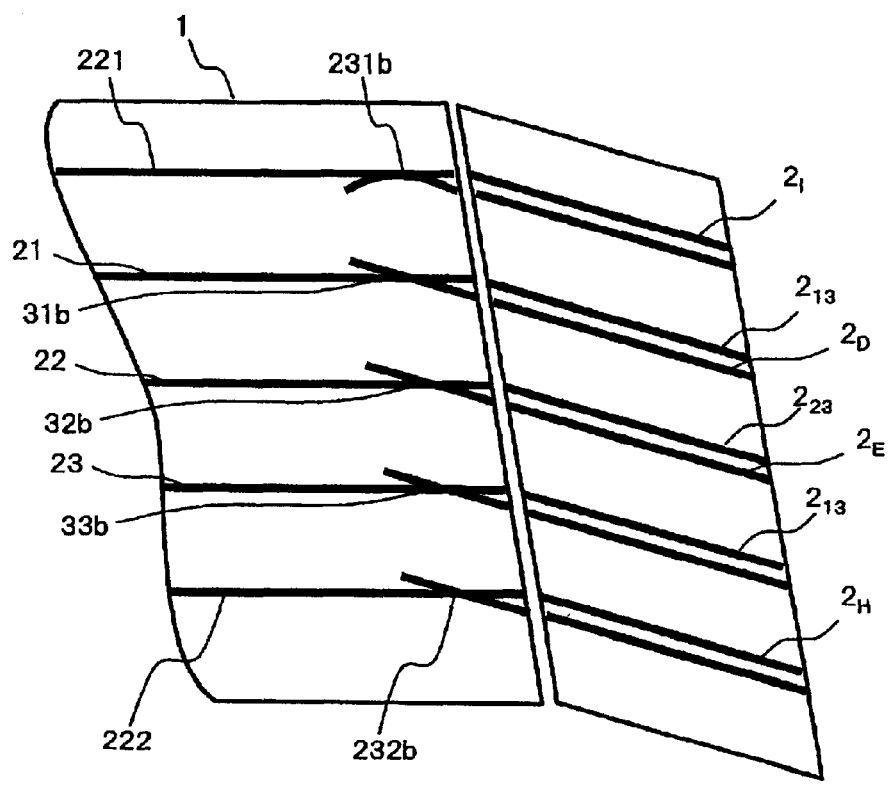
FIG. 12 is a diagram showing one example of the end face shape of a substrate in the variable wavelength filter of FIG. 10.
Figure 13:
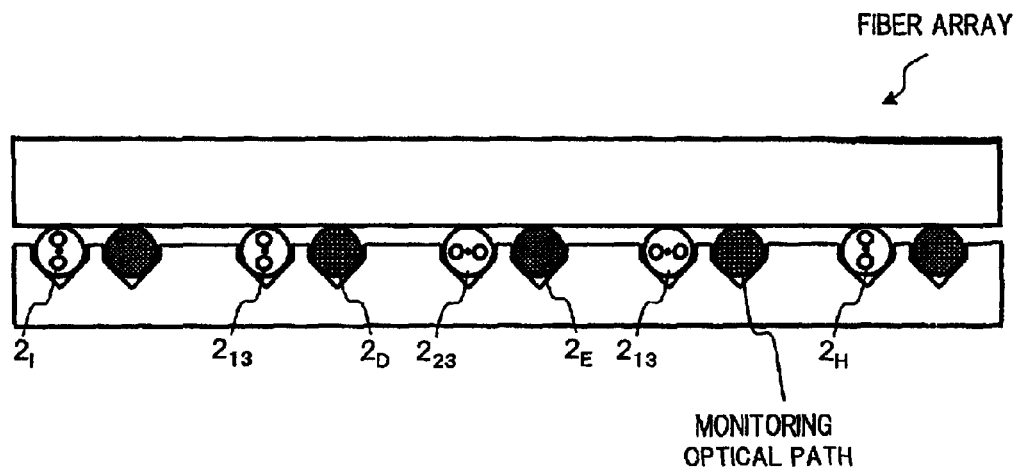
FIG. 13 is a diagram showing one example of fiber array structure connected to the substrate end face in the variable wavelength filter of FIG. 10.

It is preferable that two end faces opposite to each other of the substrate 1, to which the respective optical paths for main signal and for monitoring are connected, are inclined by required angles so as to reduce an influence of reflected light at the faces connected with the respective optical paths, for example, as shown in FIG. 12. Also, it is preferable that the optical fibers to be connected to each of the substrate end faces are structured in a fiber array, for example, as shown in FIG. 13. Note, the optical fibers provided in parallel to the respective connecting optical paths $2_{13}$ and $2_{23}$ in FIG. 13, are for extracting the dropped lights and the like to be blocked from passing through by the AOTFs at respective stages. An arrangement for the polarization axes of the polarization-preserving fibers within the fiber array is desirable to be set, considering the symmetry with a fiber array connected to the substrate end face on the opposite side, so that the kinds of the both side fiber arrays are the same.

In the variable wavelength filter having the above mentioned constitution, the input light propagated through the input optical path $2_{IN}$ is sent to the PBS 5 via the optical circulator 4 and the connecting optical path $2_A$, and split into two polarization lights orthogonal to each other, to be output to the connecting optical paths $2_B$ and $2_C$, respectively. The polarization light output to the connecting optical path $2_C$ is rotated with polarization plane thereof by 90 degrees by the polarization rotating section 6, to be aligned with the polarization direction of the polarization light output to the connecting optical path $2_B$. Then, the respective polarization lights propagated through the connecting optical paths $2_B$ and $2_C$ are given to the PBSs 31a and 32a on the substrate 1, respectively, as the TE mode lights. Note, in FIG. 10, the polarization directions of propagated lights are indicated together with the cross section of arrangement of polarization axes of the PANDA type fibers, so that the polarization directions of propagated lights at the respective portions on the optical paths cascade loop connected can be clearly understood.

The TE mode light given to the PBS 31a passes therethrough and is propagated through the optical waveguide 21 toward the PBS 31b. At this time, SAW generated as a result that the RF signal of frequency f from the RF signal generating circuit 40 is applied to the IDT 41, is guided along the optical waveguide 21 by the SAW guide 51, to be propagated in the same direction (forward direction) as the propagated light within the optical waveguide 21. Due to the acousto-optic effect by this SAW, only the light of wavelength corresponding to the frequency of SAW (selected wavelength) out of the TE mode light being propagated within the optical waveguide 21, is mode converted into a TM mode light. Then, the lights of respective modes reach the PBS 31b, the TE mode light of wavelengths different from the selected wavelength (non-selected wavelengths), that has not been mode converted, passes through the PBS 31b to be output to the connecting optical path $2_{13}$, while the mode converted TM mode light of selected wavelength is branched by the PBS 31b as a dropped light, to be sent to the optical isolator 101A of the first monitoring section 100.

The TE mode light output to the connecting optical path $2_{13}$ passes through the PANDA type fiber that is spliced by 90 degrees in the vicinity of the center in the longitudinal direction, to be sent to the PBS 33b on the optical waveguide 23. At this time, a periodic wavelength dependence loss or polarization mode dispersion (PMD) due to inter-polarization-mode interference caused in the PANDA type fiber, and a polarization dependence loss (PDL) caused in the PBS on the substrate 1 and the like are offset in front of and behind the 90 degree splice point, to be suppressed.

Here, there will be described the inter-polarization-mode interference caused within the optical paths of polarization-preserving type.

In a case where a plurality of optical devices each having polarization dependence are connected by polarization-preserving fiber or the like, it is an ideal to perform the connection by completely coinciding the polarization axis (Fast axis, Slow axis) directions of the polarization-preserving fiber with the axis direction of polarization light to be input/output to/from the optical devices. However, in the actual connection of the polarization-preserving fiber with the optical devices, it is difficult to completely coincide the axis directions with each other and thus, certain axis deviation cannot be avoided.

Figure 14:
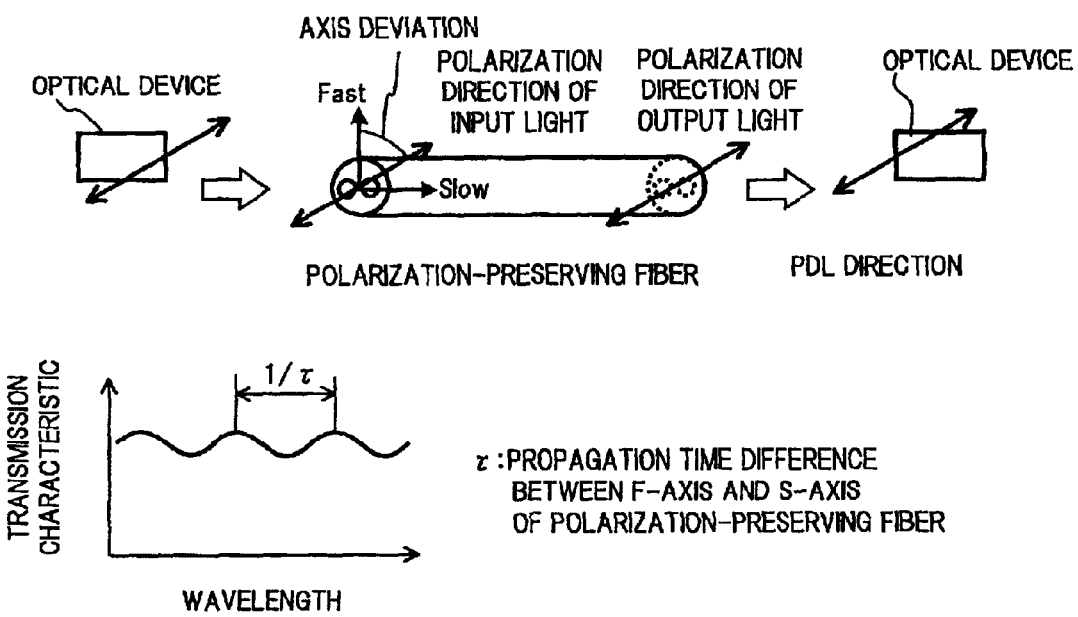
FIG. 14 is a diagram for explaining inter-polarization-mode interference of a polarization-preserving fiber.

If the axis deviation as mentioned above is caused, as shown in FIG. 14, the inter-polarization-mode interference of the polarization-preserving fiber is caused, resulted in the periodic wavelength dependence loss in the transmission characteristics of optical devices. The period of this periodic wavelength dependence loss becomes $1/\tau$, if a difference between the propagation times of Fast axis and Slow axis of the polarization-preserving fiber is $\tau$. Such a periodic wavelength dependence loss due to the inter-polarization-mode interference of the polarization-preserving fiber causes a change in level of transmission light, for example, in an optical filter of band rejection type, to lead characteristic deterioration.

Therefore, in the present variable wavelength filter, by splicing the PANDA type fiber by rotating the polarization axis thereof by 90 degrees in the vicinity of the center of the connecting optical path in the longitudinal direction, the respective directions of Fast axis and Slow axis are switched in front of and behind the splicing point, so that the polarization light to be propagated through the connecting optical path is propagated through the respective polarization axes for substantially equal distances. Thus, the influence by the above mentioned periodic wavelength dependence loss, PMD or PDL shall be offset.

The TE mode light sent to the PBS 33b on the substrate 1 passes therethrough and is propagated within the optical waveguide 23 toward the PBS 33a. At this time, SAW generated at the IDT 43 and guided by the SAW guide 53 is propagated in a reverse direction to the propagated light within the optical waveguide 23. Due to the acousto-optic effect by this SAW, only the light corresponding to the selected wavelength out of the TE mode light being propagated through the optical waveguide 23 is mode converted into a TM mode light. Then, when the lights of respective modes reach the PBS 33a, the TE mode light of non-selected wavelengths, that has not been mode converted, passes through the PBS 33a to be output to the connecting optical path $2_{23}$, while the mode converted TM mode light of selected wavelength is branched by the PBS 33a.

The TE mode light output to the connecting optical path $2_{23}$ is sent to the PBS 32b on the optical waveguide 22 while the periodic wavelength dependence loss and the like thereof being suppressed by passing the PANDA type fiber having the cross-connecting section C, in the same manner as when passed through the connecting optical path $2_{13}$.

The TE mode light sent to the PBS 32b passes therethrough and is propagated within the optical waveguide 22 toward the PBS 32a. At this time, SAW generated at the IDT 42 and guided by the SAW guide 52 is propagated in a forward direction to the propagated light within the optical waveguide 22. Due to the acousto-optic effect by this SAW, only the light corresponding to the selected wavelength out of the TE mode light being propagated through the optical waveguide 22 is mode converted into a TM mode light. The TE mode light of non-selected wavelengths, that has not been mode converted, passes through the PBS 32a to be output to the connecting optical path $2_c$, while the mode converted TM mode light of selected wavelength is branched by the PBS 32a. The TE mode light output to the connecting optical path $2_C$ is rotated with the polarization plane thereof by 90 degrees by the polarization rotating section 6 on the connecting optical path $2_C$ and then returned to the PBS 5.

The respective selected wavelengths to be mode converted at the respective optical waveguides 21 to 23 are slightly different from one another, due to the above described selected wavelength Doppler shift, or inherent wavelength deviation caused by variations in manufacturing process of the substrate 1, even in a constitution where the RF signal is applied commonly to the IDTs 41 to 43. This wavelength deviation by variations in manufacturing process is caused inherently in individual substrate due to manufacturing errors in widths of optical waveguides 21 to 23 at respective stages. Therefore, in the variable wavelength filter shown in FIG. 10, the wavelength deviation inherent to the substrate caused by variations in manufacturing process is considered and also the selected wavelength difference $\Delta\lambda$ due to the selected wavelength Doppler shift is utilized, to ensure a required width of blocking band by slightly deviating the selected wavelengths in the AOTFs at respective stages with one another as in FIG. 4.

Figures 15A, 15B, 15C:
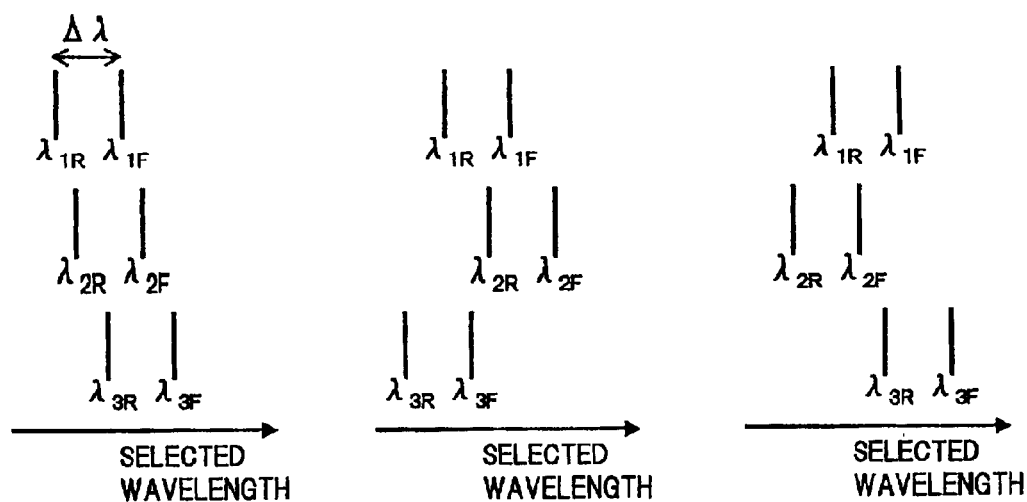
FIG. 15A to FIG. 15C are exemplary diagrams of wavelength deviation patterns.
Figure 15D:
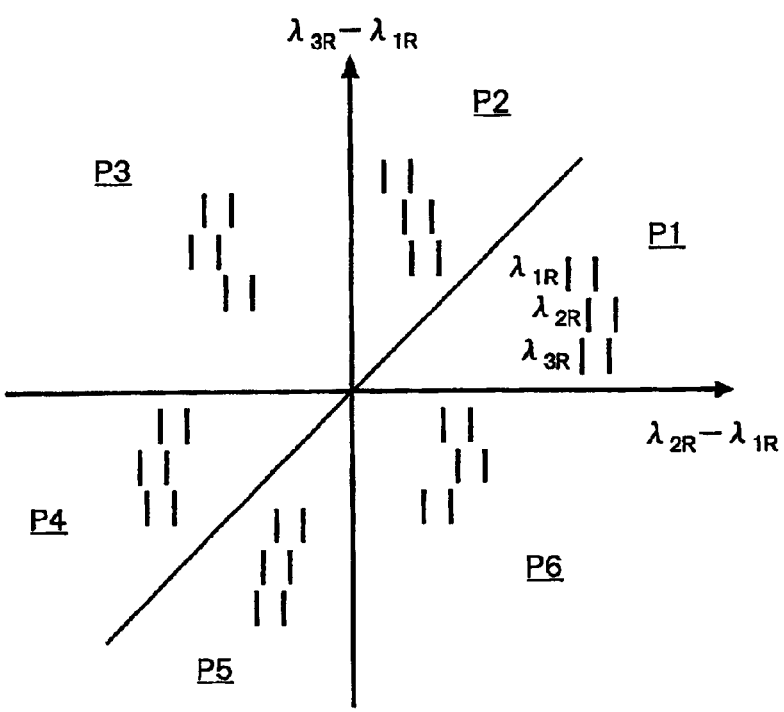
FIG. 15D is a diagram showing a typical wavelength deviation pattern.

Specifically, when the selected wavelengths corresponding to the respective optical waveguides 21, 22, 23 when SAWs of the same frequency f are given in the forward directions to the propagated lights are made $\lambda_{1F}$, $\lambda_{2F}$ and $\lambda_{3F}$, while the selected wavelengths corresponding to the respective optical waveguides 21, 22, 23 when SAWs of the same frequency f are given in the reverse directions to the propagated lights are made $\lambda_{1R}$, $\lambda_{2R}$ and $\lambda_{3R}$, there occurs various patterns in the wavelength deviation inherent to the substrate caused by variations in manufacturing process, as shown in FIG. 15A to FIG. 15C, for example. Such wavelength deviation patterns of the three staged AOTFs can be classified into six patterns P1 to P6 as shown in FIG. 15D when the values of $\lambda_{2R-\lambda 1R}$ are put on the horizontal axis and the values of $\lambda_{3R-\lambda 1R}$ are put on the transverse axis with the selected wavelength $\lambda_{1R}$ as the reference.

In order to realize the selected wavelengths that are slightly deviated among the respective stages as shown in FIG. 4, it is required to determine optimum combinations of the wavelength deviation of the patterns P1 to P6, with the wavelength difference due to the selected wavelength Doppler shift. When determining the optimum combinations, it is desired to consider the condition that the connection relationship in which such kinds of fiber arrays as explained in FIG. 13 can be made same on the both ends of the substrate 1, and the connection relationship of the input and output for suppressing an influence by stray light as described in the following, are satisfied at the same time.

In a case where a plurality of optical devices integrated on the same substrate are connected to be used, most of the input light from a substrate input section passes through the optical devices, however, as shown by an arrow in dotted line in FIG. 10, a part of the input light is emitted into the substrate to be propagated as the stray light S. This stray light S is likely to be coupled to an output section bypassing the optical devices, thereby causing deterioration of extinction ratio and the like.

In order to effectively suppress such a leakage phenomenon of the stray light S from the input side to the output side, for example, in a case where a plurality of optical devices on the same substrate are cascade connected to be used, such a connection relationship is preferable that both ends of optical path passing through all of optical devices are positioned on the same end face of the substrate. By realizing such a connection relationship, the stray light S from the input side is hardly to be coupled to the light being propagated within the optical path on the output side.

The optimum combinations satisfying all the conditions of the above mentioned selected wavelength Doppler shift and the like, including the connection relationship of input and output for suppressing the above influence by the stray light, can be determined corresponding to the respective patterns P1 to P6 in FIG. 15D, and the combination results are shown in FIG. 16.

In FIG. 16, the numerals ① to ⑥ indicated at both ends of the substrate show the connecting orders of AOTFs at respective stages. Further, characters such as "F-F-R" (forward-forward-reverse) indicated at the upper part of the substrate show the propagation direction of SAW relative to the light being propagated through the optical waveguide positioned at the upper stage of the substrate in the figure, the propagation direction of SAW relative to the light being propagated through the optical waveguide positioned at the middle stage of the substrate, and the propagation direction of SAW relative to the light being propagated through the optical waveguide positioned at the lower stage of the substrate, in this sequence. Further, arrangements of respective polarization axes of when the respective PANDA type fibers connected to the both ends of the substrate are made fiber arrays of same kind, are shown on the right and left sides of the substrate.

The constitution of the variable wavelength filter shown in FIG. 10 specifically illustrates the connection relationship corresponding to the pattern P1 in FIG. 16. For the selected wavelength Doppler shift, the arrangement of the IDTs 41, 43 and 42 at the respective stages are set so that, to the light given via the connecting optical path $2_B$, the propagation direction of SAW in the AOTF of the first stage corresponding to the optical waveguide 21 is the forward direction, the propagation direction of SAW in the AOTF of the second stage corresponding to the optical waveguide 23 is the reverse direction, and the propagation direction of SAW in the AOTF of the third stage corresponding to the optical waveguide 22 is the forward direction. In the AOTFs at respective stages, since the RF signal of the same frequency is given to the IDTs, the wavelength difference due to the selected wavelength Doppler shift corresponding to the above equation (2) is caused between the selected wavelengths at the first and third stages, and the selected wavelength at the second stage. Thus, by combining the wavelength difference with the inherent wavelength deviation of the pattern P1, it becomes possible to realize the filter characteristic as shown in FIG. 4.

Meanwhile, in the variable wavelength filter, the TE mode light given from the PBS 5 to the PBS 32a of the substrate 1 via the connecting optical path $2_C$ and the polarization rotating section 6 passes through the AOTFs at respective stages sequentially, in reverse to the TE mode light given to the PBS 31a of the substrate 1 via the connecting optical path $2_B$, namely, passes sequentially through the optical waveguide 22, PBS 32a, connecting optical path $2_{23}$, PBS 33a, optical waveguide 23, PBS 33b, connecting optical path $2_{13}$, PBS 31b, optical waveguide 21 and PBS 31a, to be output to the connecting optical path $2_B$, and is returned to the PBS 5 under the polarization state just as is without polarization plane thereof rotated. In this reverse propagation of the polarization light, the mode converted TM mode light corresponding to the selected wavelength when being propagated through the optical waveguide 22, is branched by the PBS 32b as the dropped light, to be sent to the optical isolator 101B of the first monitoring section 100.

The respective polarization lights with polarization planes thereof being orthogonal to each other, returned to the PBS 5 via the connecting optical paths $2_B$ and $2_C$, are multiplexed by the PBS 5 and thereafter sent to the optical circulator 4 via the connecting optical path $2_A$, to be output to the output optical path $2_{OUT}$ after passing from the port 4b to the port 4c.

As mentioned above, when the polarization lights from the connecting optical paths $2_B$ and $2_C$ are propagated in bi-directions through the three staged AOTFs cascade loop connected on the substrate 1, the stray light S generated from each of the PBSs 31a and 32a at the one end of each of the optical waveguides 21 and 22 is propagated toward the end face on the opposite side to the optical input side of the substrate 1. However, since the connecting optical paths $2_B$ and $2_C$ are connected to the PBSs 31a and 32a positioned on the same end face of the substrate 1, respectively, the leakage phenomenon of the stray light from the input side to the output side is suppressed.

Moreover, in the variable wavelength filter, the dropped lights branched by the PBSs 31b and 32b, pass through the optical isolators 101A and 101B of the first monitoring section 100, to be converted into electrical signals at the light receivers 102A and 102B, respectively, and further are added up by the circuit 103 to be sent to the RF signal controlling section 300 as the monitor signal M1. In the RF signal controlling section 300, the peak wavelengths of the dropped lights are detected based on the monitor signal M1, and an amount of wavelength deviation to the previously set control value (selected wavelength) is obtained based on the monitoring result by the second monitoring section 200.

In the RF signal controlling section 300, as a method for detecting the peak wavelengths of the dropped lights based on the monitor signal M1, for example, a method to add dithering to the frequency f of RF signal to be applied commonly to the IDTs 41 to 43 at the respective stages, is suitable. Specifically, in a case where the frequency f of RF signal is set to, for example, 170 MHz, 4 kHz or the like is set as the frequency Δf of the dithering, and the RF signal of which frequency fluctuates within a range of f± Δf is applied to each of the IDTs 41 to 43. Thus, the selected wavelengths to be mode converted in the AOTFs at the respective stages fluctuate corresponding to the frequency Δf of the dithering. Accordingly, the monitor signal M1 to be monitored by the first monitoring section 100 includes frequency components corresponding to the dithering. Thus, it becomes possible to detect the peak wavelengths of the actually dropped lights by utilizing the detected frequency components.

Here, in a case where the dithering is added to the frequency of RF signal, it is desirable that, for the blocking band as shown in FIG. 4, the dropped light is taken out from the AOTF stage of which selected wavelength is positioned at the center of the blocking band, to monitor the dropped light by the first monitoring section 100. This is a useful setting for realizing the stable peak wavelength detection, by avoiding such a situation where, for example, if the dropped light from the AOTF stage of which selected wavelength is positioned at the end portion of the blocking band is monitored, the wavelength of the dropped light fluctuating by the dithering reaches the wavelength region where the transmissivity is steeply changed, so that the level of dropped light to be monitored by the first monitoring section 100 is largely changed, thereby resulting in a possibility that the peak wavelength of dropped light cannot be accurately detected.

In the constitution of FIG. 10, the setting of the blocked wavelengths (selected wavelength) corresponding to the optical waveguides 21 to 23 on the substrate 1 is indicated in the relationship as shown in FIG. 17. Therefore, for the light given to the substrate 1 via the connecting optical path $2_B$ and propagated sequentially through the optical waveguides 21, 23 and 22, the monitoring is performed on the dropped light in the optical waveguide 21 corresponding to the wavelength $\lambda_{1F}$ positioned substantially at the center of the blocking band, depending on the relationship of blocking wavelength as shown by a bold line in the figure. Moreover, for the light given to the substrate 1 via the connecting optical path $2_C$ and propagated sequentially through the optical waveguides 22, 23 and 21, the monitoring is performed on the dropped light in the optical waveguide 22 corresponding to the wavelength $\lambda_{2R}$, depending on the relationship of blocking wavelength as shown by a thin line in the figure.

Based on the peak wavelengths of dropped lights detected in the above manner, the wavelength deviation amount to the previously set control value (selected wavelength) is obtained based on the monitoring result by the second monitoring section 200, and a controlling signal for correcting the frequency of RF signal is generated according to the wavelength deviation amount, to be output to the RF signal generating circuit 40. Then, in the RF signal generating circuit 40, in accordance with the controlling signal from the RF signal controlling section 300, the frequency f of RF signal is corrected, and the corrected RF signal is applied commonly to the IDTs 41 to 43 at the respective stages. Thus, even if the filter characteristic is changed due to a change in temperature, deterioration with time lapse or the like, it becomes possible to block reliably and stably a light of desired wavelength from passing through, by tracking and controlling the frequency of RF signal.

Further, in the present variable wavelength filter, at the starting time or at the alteration of setting, a process for previously detecting the control value of the AOTFs cascade loop connected on the substrate 1 is executed by the RF signal controlling section 300 based on the monitor signal M2 from the second monitoring section 200. In the second monitoring section 200, there is monitored the light passed through the monitoring AOTFs that operate in accordance with the same parameter as for the three staged AOTFs cascade connected on the substrate 1. That is, the branched light from the optical coupler 201 on the input optical path $2_{IN}$ is polarization split by the PBS 202. One of the polarization lights is given, as a TE mode light, to the PBS 231a on the optical waveguide 221 of the substrate 1 via the connecting optical path $2_G$, to be propagated within the optical waveguide 221 toward the PBS 231b. At this time, due to the acousto-optic effect of SAW generated at the IDT 241 and propagated through the SAW guide 251, only the light corresponding to the selected wavelength out of the TE mode light being propagated within the optical waveguide 221 is mode converted into a TM mode light. Then, when the respective mode lights reach the PBS 231b, the mode converted TM mode light of selective wavelength passes therethrough and is sent to the PBS 204 via the connecting optical path $2_I$.

On the contrary, the other polarization light polarization split by the PBS 202 is rotated with polarization plane thereof by 90 degrees by the polarization rotating section 203, and then given, as a TE mode light, to the PBS 232b on the optical waveguide 222 of the substrate 1 via the connecting optical path $2_H$, to be propagated within the optical waveguide 222 toward the PBS 232a. At this time, due to the acousto-optic effect of SAW generated at the IDT 242 and propagated through the SAW guide 252, only the light corresponding to the selected wavelength out of the TE mode light being propagated within the optical waveguide 222 is mode converted into a TM light. Then, when the respective mode lights reach the PBS 232a, the mode converted TM mode light of selective wavelength passes therethrough, and is rotated with polarization plane thereof by 90 degrees by the polarization rotating section 205 and then sent to the PBS 204 via the connecting optical path $2_J$.

In the PBS 204, the polarization lights with polarization planes being orthogonal to each other from the connecting optical paths $2_I$ and $2_J$, are multiplexed to be sent to the light receiver 206. In the light receiver 206, the monitor signal from the PBS 204 is converted into an electrical signal, to be output to the RF signal controlling section 300, as the monitor signal M2.

In the RF signal controlling section 300, at the starting time or at the alteration of setting, a controlling signal for sweeping the frequency of RF signal within a required range is generated, to be output to the RF signal generating circuit 40. Then, the wavelengths of lights actually selected by the monitoring AOTFs on the substrate 1 are detected based on the monitor signal M2 from the second monitoring section 200, corresponding to the RF signals of respective swept frequencies, and in accordance with the detection result, the RF signal frequency corresponding to a desired selected wavelength is judged to be initially set as a control value for the starting time or the time of alteration of setting.

The control value set based on the monitor signal M2 from the second monitoring section 200, is determined in accordance with the wavelengths of lights actually passed through the monitoring AOTFs that operate in accordance with the same control parameter (frequency of RF signal) for the AOTFs cascade connected that process the main signal light, and therefore, can achieve an extremely higher precision, compared with a value obtained by using a monitoring device that operates in accordance with a different control parameter. In the variable wavelength filter to be used for the OXC apparatus, OADM apparatus or the like, if the light of wavelength that is needed to pass through, is erroneously blocked, the services to the users are suspended. Therefore, the control parameter requires a high precision in the initial value thereof. Accordingly, it is very useful that the controlling function of RF signal based on the monitoring result by the second monitoring section 200 is provided in the variable wavelength filter.

As described above, according to the present variable wavelength filter, the wavelength deviation inherent to the substrate caused by variations in manufacturing process is considered and also the selected wavelength $\Delta\lambda$ due to the selected wavelength Doppler shift is utilized, to de selected wavelengths in the AOTFs at respective stages that are cascade loop connected. Thereby, since a blocking band having the wavelength width corresponding to the deviation amount is formed, it becomes possible to reliably and stably block an optical signal of a desired wavelength from passing through and also to realize a variable wavelength filter of rejection type having an excellent extinction ratio.

What is claimed is:

1. An optical wavelength filter of band rejection type comprising a plurality of optical filter sections each blocking a light corresponding to a selected wavelength from passing through, said plurality of optical filter sections being cascade connected to be in a multi-staged structure, wherein respective selected wavelengths of said plurality of optical filter sections are deviated from one another, to form a blocking band having a wavelength band corresponding to a deviation amount between said selected wavelengths, the wavelength band of the blocking band being wider than a wavelength band provided by each respective optical filter of said plurality of optical filters by itself.

2. An optical wavelength filter according to claim 1, wherein each of said optical filter sections includes an acousto-optic filter that blocks a light corresponding to the selected wavelength from passing through, by utilizing an acousto-optic effect.

3. An optical wavelength filter according to claim 2, wherein widths of optical waveguides constituting said acousto-optic filters are made to differ from one another, to deviate the selected wavelengths in the respective acousto-optic filters from one another.

4. An optical wavelength filter according to claim 2, wherein RF signals of different frequencies are given to said acousto-optic filters, to deviate the selected wavelengths in the respective acousto-optic filters from one another.

5. An optical wavelength filter according to claim 2, wherein propagation directions of acoustic waves to light propagation directions in said acousto-optic filters are changed, to deviate the selected wavelengths in the respective acousto-optic filters from one another.

6. An optical wavelength filter according to claim 2, wherein acoustic velocities of acoustic wave guides constituting said acousto-optic filters are made to differ from one another, to deviate the selected wavelengths in the respective acousto-optic filters from one another.

7. An optical wavelength filter according to claim 1, wherein both ends of an optical path passing through said plurality of optical filter sections are connected to each other, to form a cascade loop connection through which a light is input/output.

8. An apparatus comprising:
a first optical filter blocking light at a first wavelength selectable by the first optical filter; and
a second optical filter blocking light at a second wavelength selectable by the second optical filter, the first and second wavelengths being different from each other by a deviation amount, wherein the first and second optical filters are arranged in series to form a blocking band having a bandwidth corresponding to the deviation amount, the bandwidth of the blocking band being wider than a bandwidth provided by either the first or second optical filter by itself.

9. An apparatus as in claim 8, wherein the first and second optical filters are acousto-optic tunable filters (AOTFs).

10. An apparatus as in claim 9, wherein the first and second optical filters are controllable to select the first and second wavelengths, respectively, and thereby change the blocking band.

11. An apparatus as in claim 8, wherein a wavelength division multiplexed (WDM) optical signal passes through the first and second filters in sequence, and is thereby filtered in accordance with the blocking band.

12. An apparatus as in claim 9, wherein a wavelength division multiplexed (WDM) optical signal passes through the first and second filters in sequence, and is thereby filtered in accordance with the blocking band.

13. An apparatus as in claim 10, wherein a wavelength division multiplexed (WDM) optical signal passes through the first and second filters in sequence, and is thereby filtered in accordance with the blocking band.

14. An apparatus as in claim 9, wherein widths of optical waveguides forming the AOTFs are made to differ from one another, to deviate the selected first and second wavelengths in the respective AOTFs from one another.

15. An apparatus as in claim 9, wherein RF signals of different frequencies are applied to the AOTFs, to deviate the selected first and second wavelengths in the respective AOTFs from one another.

16. An apparatus as in claim 9, wherein propagation directions of acoustic waves to light propagation directions in the AOTFs are changed, to deviate the selected first and second wavelengths in the respective AOTFs from one another.

17. An apparatus as in claim 9, wherein acoustic velocities of acoustic waveguides forming the AOTFs are made to differ from one another, to deviate the selected first and second wavelengths in the respective AOTFs from one another.

18. An apparatus as in claim 8, wherein the first and second optical filters are connected together to form a cascade loop through which light is input/output.

19. An apparatus comprising:
an optical filter comprising
a first acousto-optic tunable filter (AOTF) blocking light at a first wavelength selectable by the first AOTF,
a second AOTF blocking light at a second wavelength selectable by the second AOTF, the first and second wavelengths being different from each other by a deviation amount; and
means for arranging the first and second AOTFs in series to form a blocking band having a bandwidth corresponding to the deviation amount, the bandwidth of the blocking band being wider than a bandwidth provided by either the first or second AOTF by itself.

20. An apparatus as in claim 19, wherein a wavelength division multiplexed (WDM) optical signal passes through the first and second AOTFs in sequence, and is thereby filtered in accordance with the blocking band.

21. An apparatus comprising:
optical filters blocking light at respectively corresponding selectable wavelengths which deviate from one another, the optical filters being connected together in series to form a blocking band having a bandwidth corresponding to deviation amounts between the wavelengths, the bandwidth of the blocking band being wider than a bandwidth provided by each respective optical filter of said optical filters by itself.

22. An apparatus as in claim 21, wherein the optical filters are acousto-optic tunable filters (AOTFs).

23. An apparatus as in claim 22, wherein the AOTFs are controllable to select the corresponding wavelengths and thereby change the blocking band.

24. An apparatus as in claim 21, wherein a wavelength division multiplexed (WDM) optical signal passes through the optical filters in sequence, and is thereby filtered in accordance with the blocking band.

25. An apparatus as in claim 22, wherein a wavelength division multiplexed (WDM) optical signal passes through the optical filters in sequence, and is thereby filtered in accordance with the blocking band.

26. An apparatus as in claim 22, wherein widths of optical waveguides forming the AOTFs are made to differ from one another, to deviate the selected wavelengths in the respective AOTFs from one another.

27. An apparatus as in claim 22, wherein RF signals of different frequencies are applied to the AOTFs, to deviate the selected wavelengths in the respective AOTFs from one another.

28. An apparatus as in claim 22, wherein propagation directions of acoustic waves to light propagation directions in the AOTFs are changed, to deviate the selected wavelengths In the respective AOTFs from one another.

29. An apparatus as in claim 22, wherein acoustic velocities of acoustic waveguides forming the AOTFs are made to differ from one another, to deviate the selected wavelengths in the respective AOTFs from one another.

30. An apparatus as in claim 21, wherein the optical filters are connected together to form a cascade loop through which light is input/output.

31. An apparatus comprising:

acousto-optic tunable filters (AOTFs) blocking light at respectively corresponding selectable wavelengths which deviate from one another; and means for arranging the AOTFs together in series to form a blocking band having a bandwidth corresponding to deviation amounts between the wavelengths, the bandwidth of the blocking band being wider than a bandwidth provided by each respective AOTF of said AOTFs by itself.

* * * * *

UNITED STATES PATENT AND TRADEMARK OFFICE
CERTIFICATE OF CORRECTION

PATENT NO. : 6,783,282 B2
DATED : August 31, 2004
INVENTOR(S) : Tadao Nakazawa et al.

It is certified that error appears in the above-identified patent and that said Letters Patent is hereby corrected as shown below:

Column 21,
Line 20, change "In" to -- in --.

Signed and Sealed this

Eighteenth Day of January, 2005

JON W. DUDAS
*Director of the United States Patent and Trademark Office*